(12) United States Patent
Russell et al.

(10) Patent No.: US 8,006,983 B2
(45) Date of Patent: Aug. 30, 2011

(54) SEALING ASSEMBLY FOR USE WITH A PRESSURIZED VESSEL AND METHODS OF ASSEMBLING THE SAME

(75) Inventors: Steven Craig Russell, Houston, TX (US); Nicholas Simon Graham, Potomac, MD (US); Kelsey Elizabeth Beach, Rockford, IL (US); James Michael Storey, Houston, TX (US)

(73) Assignee: General Electric Company, Schenectady, NY (US)

( * ) Notice: Subject to any disclaimer, the term of this patent is extended or adjusted under 35 U.S.C. 154(b) by 586 days.

(21) Appl. No.: 11/965,079

(22) Filed: Dec. 27, 2007

(65) Prior Publication Data
US 2009/0166975 A1   Jul. 2, 2009

(51) Int. Cl.
*F16L 21/02* (2006.01)
*F16J 15/02* (2006.01)

(52) U.S. Cl. .......... 277/314; 277/630; 277/637

(58) Field of Classification Search .......... 277/500, 277/630, 637, 650, 654, 314
See application file for complete search history.

(56) References Cited

U.S. PATENT DOCUMENTS

| | | | | | |
|---|---|---|---|---|---|
| 3,190,350 | A | * | 6/1965 | Chute | 165/9 |
| 3,741,288 | A | * | 6/1973 | Vallance | 165/9 |
| 4,098,323 | A | * | 7/1978 | Wiegard et al. | 165/9 |
| 4,105,062 | A | * | 8/1978 | Bell et al. | 165/9 |
| 4,183,539 | A | * | 1/1980 | French et al. | 165/9 |
| 4,212,472 | A | * | 7/1980 | Mizuno et al. | 165/9 |
| 4,383,693 | A | * | 5/1983 | Heller | 277/606 |
| 4,823,836 | A | * | 4/1989 | Bachmann et al. | 137/601.06 |
| 5,524,846 | A | * | 6/1996 | Shine et al. | 244/53 R |
| 5,987,879 | A | * | 11/1999 | Ono | 60/800 |
| 2006/0076126 | A1 | * | 4/2006 | Fandry | 165/159 |

* cited by examiner

*Primary Examiner* — Vishal Patel
(74) *Attorney, Agent, or Firm* — Armstrong Teasdale LLP (57) ABSTRACT

A method for assembling a seal assembly is provided. The method includes coupling a first ring within a vessel, coupling a second ring within the vessel, and coupling a first seal layer between the first ring and the second ring such that the first seal layer contacts at least the first ring.

15 Claims, 8 Drawing Sheets

SEALING ASSEMBLY FOR USE WITH A PRESSURIZED VESSEL AND METHODS OF ASSEMBLING THE SAME

BACKGROUND OF THE INVENTION

This invention relates generally to a sealing assembly, and more particularly, to a sealing assembly for use with a pressurized vessel.

One known pressurized vessel is a syngas cooler. In at least some known syngas coolers, a regulated nitrogen purge, with a controlled flow rate, is directed into an annular space defined between a shell and a tubecage of the cooler from the top of a cooler vessel. The nitrogen purge maintains a substantially continuous and circumferentially uniform positive flow through the annular space to prevent syngas from flowing into the space and creating pockets of corrosive gases. If an effective area of the annular space is too large to achieve the uniform, positive flow with a limited flow rate of nitrogen, a seal may be used to minimize the size of the entrance into the annulus from the bottom of the cooler. Furthermore, stresses induced in the tubecage and/or in the shell by the seal must be below the yield strength of the tubecage and/or shell. Moreover, after lightoff of a gasifier, there may be a transient event during which a syngas pressure wave travels through the cooler and creates a large pressure difference across the tubecage. During this event, a seal may be used to relieve the pressure differential across the tubecage by accommodating syngas backflow into the annular space.

At least two known seals designs are used in syngas coolers to restrict the syngas flow from the bottom of the cooler into the annulus. The first of such seal designs uses a pinched ring of fiber insulation material that extends from the tubecage and makes contact with a plate extending from a cooler vessel wall. The plate slides vertically to enable the seal to accommodate thermal expansion of the tubecage. The seal also includes at least one relief valve that enables syngas to flow into the annular space during a syngas backflow at lightoff. However, in such a seal, the moving parts that control the relief valve(s) may become corroded and/or clogged with particulate matter.

The second of such known seal designs includes a hinged ring of folded metal plates, called "pillows," that are coupled to an inner support ring on the tubecage and that contact the cooler vessel wall. During syngas backflow, the pillows pivot upwards on the hinges, and away from the vessel wall, to relieve the pressure on the tubecage. After the backflow, the pillows pivot downward and re-establish contact with the vessel wall. However, such a seal design is prone to failure, as the pillow may become stuck in the open position. As such, positive uniform flow of nitrogen purge gas is not maintained, and thus allows a constant flow of syngas into the annular space, which may cause dew point corrosion of the vessel wall. Furthermore, in such a seal design, the effective area for flow between the pillows and the vessel wall may be of a size that the nitrogen purge may not have a uniform positive flow through the seal.

As such, neither of the known seal designs is typically able to achieve a successful nitrogen purge of the annular space. Furthermore, the effectiveness of both of the known seal designs may be limited as a result of particle buildup and/or plugging.

BRIEF DESCRIPTION OF THE INVENTION

In one aspect, a method for assembling a seal assembly is provided. The method includes coupling a first ring within a vessel, coupling a second ring within the vessel, and coupling a first seal layer between the first ring and the second ring such that the first seal layer contacts at least the first ring.

In another aspect, a seal assembly for use within a pressurized vessel is provided. The seal assembly includes a first ring, a second ring spaced radially outwardly from the first ring, and a first seal layer coupled to the first ring, wherein the first seal layer contacts at least the first ring.

In still another aspect, a syngas cooler is provided. The syngas cooler includes a shell wall and a component coupled radially inward from the shell wall such that a gap is defined between the shell wall and the component. The syngas cooler also includes a seal assembly coupled within the gap. The seal assembly includes a first ring coupled to the component, a second ring coupled to the shell wall, and a first seal layer coupled to the first ring, wherein the first seal layer contacts at least the first ring.

DETAILED DESCRIPTION OF THE INVENTION

Figure 1:
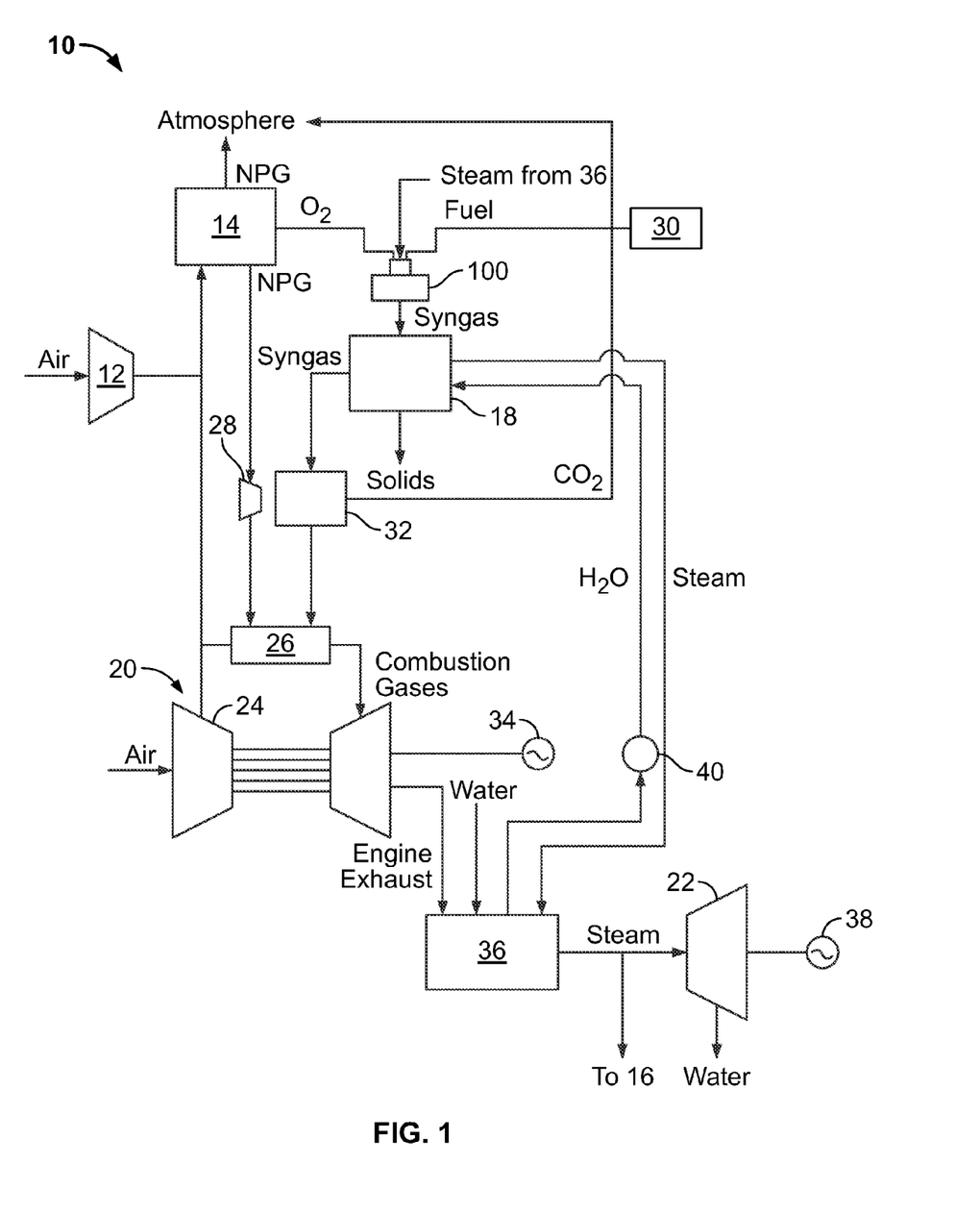
FIG. 1 is a schematic illustration of an exemplary integrated gasification combined-cycle (IGCC) power generation system.

FIG. 1 is a schematic diagram of an exemplary integrated gasification combined-cycle (IGCC) power generation system 10. IGCC system 10 generally includes a main air compressor 12, an air separation unit (ASU) 14 coupled in flow communication to compressor 12, a gasifier 16 coupled in flow communication to ASU 14, a syngas cooler 100 coupled in flow communication to gasifier 16, a gas turbine engine 20 coupled in flow communication to syngas cooler 100, and a steam turbine 22 coupled in flow communication to syngas cooler 100.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas". The $O_2$ flow is channeled to gasifier 16 for use in generating partially combusted gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a compressor 28 for compressing the nitrogen process gas flow before being injected into the combustion zone of gas turbine engine combustor 26.

In the exemplary embodiment, gasifier 16 converts a mixture of fuel supplied from a fuel supply 30, $O_2$ supplied by ASU 14, steam, and/or limestone into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, the syngas generated by gasifier 16 includes carbon dioxide. Gasifier 16 may be a fixed-bed gasifier, a fluidized-bed gasifier, and/or a fully entrained gasifier.

In the exemplary embodiment, syngas generated by gasifier 16 is channeled to syngas cooler 100 to facilitate cooling the syngas, as described in more detail below. The cooled syngas is channeled from cooler 100 to a clean-up device 32 for cleaning the syngas before it is channeled to gas turbine engine combustor 26 for combustion thereof. Carbon dioxide ($CO_2$) may be separated from the syngas during clean-up and, in the exemplary embodiment, may be vented to the atmosphere. Gas turbine engine 20 drives a generator 34 that supplies electrical power to a power grid (not shown). Exhaust gases from gas turbine engine 20 are channeled to a heat recovery steam generator 36 that generates steam for driving steam turbine 22. Power generated by steam turbine 22 drives an electrical generator 38 that provides electrical power to the power grid. In the exemplary embodiment, steam from heat recovery steam generator 36 is supplied to gasifier 16 for generating syngas.

Furthermore, in the exemplary embodiment, system 10 includes a pump 40 that supplies boiled water from steam generator 36 to syngas cooler 100 to facilitate cooling the syngas channeled from gasifier 16. The boiled water is channeled through syngas cooler 100 wherein the water is converted to steam. The steam from cooler 100 is then returned to steam generator 36 for use within gasifier 16, syngas cooler 100, and/or steam turbine 22.

Figure 2:
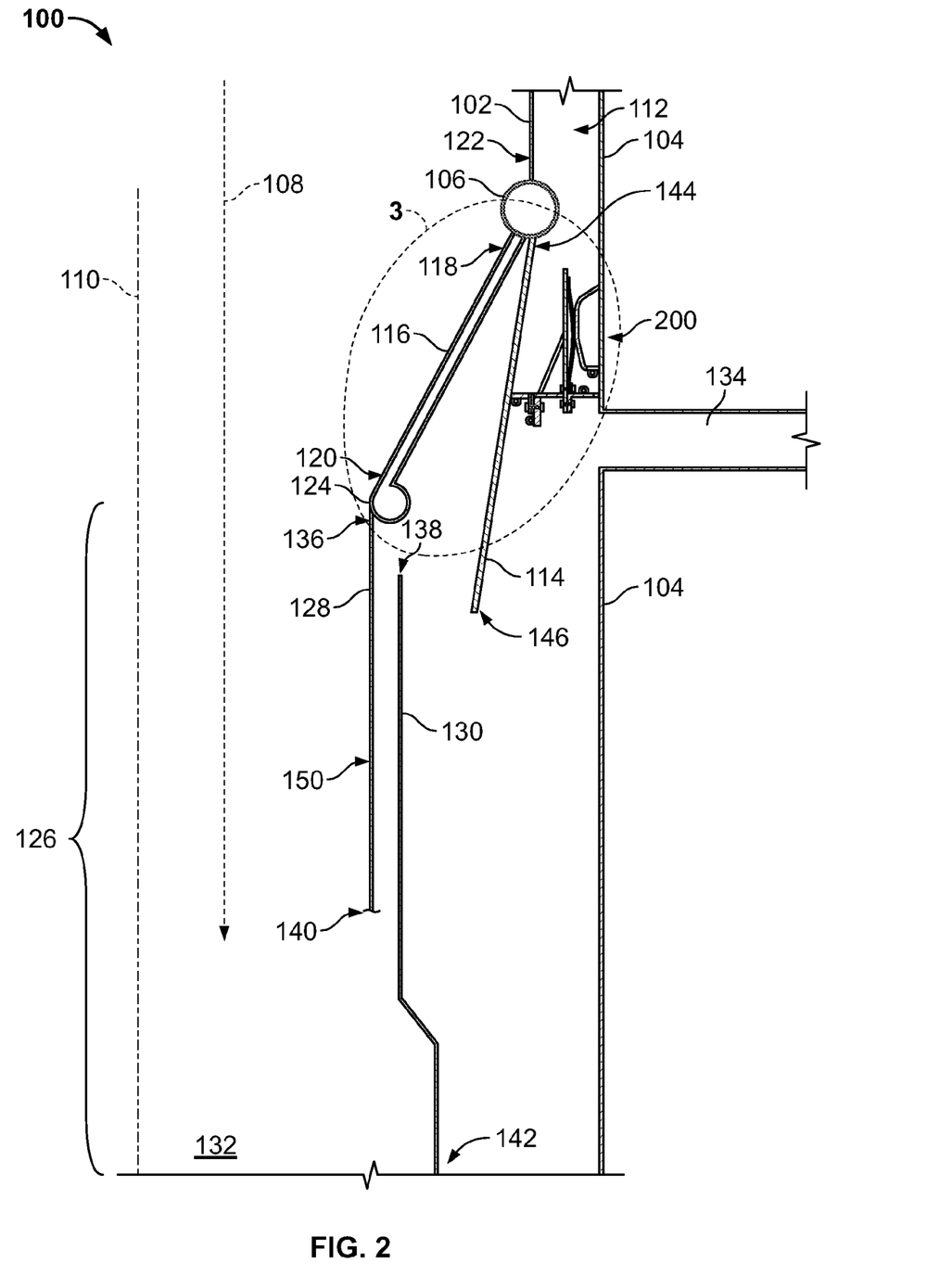
FIG. 2 is a schematic cross-sectional view of an exemplary syngas cooler that may be used with the IGCC power generation system shown in FIG. 1.

FIG. 2 is a schematic cross-sectional view of syngas cooler 100 that may be used with system 10 (shown in FIG. 1). In the exemplary embodiment, syngas cooler 100 is a radiant syngas cooler. Alternatively, cooler 100 is any type of cooler that enables system 10 to function as described herein. Syngas cooler 100 includes a plurality of heat exchange devices, such as a heat exchange wall or tubecage 102, and/or platens (not shown). In the exemplary embodiment, heat exchange wall 102 includes a plurality of substantially parallel tubes (not shown) that substantially isolate a cooler shell wall 104 from syngas (not shown) flowing through cooler 100. The tubes may channel a heat transfer fluid (not shown) therethrough, such as, but not limited to, water and/or steam, for example, discharged from steam generator 36 (shown in FIG. 1). In the exemplary embodiment, the heat transfer fluid is supplied to heat exchange wall 102 via a header 106. A main syngas flowpath 108 is defined within heat exchange wall 102. In the exemplary embodiment, flowpath 108 is generally aligned substantially parallel to a longitudinal axis 110 of cooler 100. Furthermore, as used herein, the terms "upstream" and "downstream" are defined with respect to main syngas flowpath 108, such that, in the exemplary embodiment, a top (not shown) of cooler 100 is considered "upstream" from a bottom (not shown) of cooler 100.

In the exemplary embodiment, shell wall 104 has a substantially circular cross-sectional shape with axis 110 as a centerline. Alternatively, shell wall 104 may have any cross-sectional shape that enables cooler 100 to function as described herein. In the exemplary embodiment, shell wall 104 is fabricated from a pressure vessel quality steel, such as, but not limited to, a chromium molybdenum steel. As such, shell wall 104 is facilitated to withstand the operating pressures of syngas flowing through syngas cooler 100. Moreover, in the exemplary embodiment, a top opening (not shown) of shell wall 104 is positioned in flow communication with gasifier 16 (shown in FIG. 1) for receiving syngas discharged from gasifier 16. A bottom opening (not shown) of shell wall 104, in the exemplary embodiment, is positioned in flow communication with a slag collection unit (not shown) to enable the collection of solid particles formed during gasification and/or cooling.

In the exemplary embodiment, heat exchange wall 102 is radially inward from shell wall 104 such that a gap 112 is defined between heat exchange wall 102 and shell wall 104. Gap 112 is also at least partially defined by a splash plate 114 that is coupled downstream from heat exchange wall 102. In the exemplary embodiment, splash plate 114 extends downstream from heat exchange wall 102. During operation, gap 112 is pressurized with a non-reactive pressuring fluid (not shown), such as nitrogen gas, to facilitate decreasing stresses induced to heat exchange wall 102 and to facilitate preventing syngas from entering gap 112. In the exemplary embodiment, a seal assembly 200 is coupled within gap 112, as described in more detail below, to facilitate preventing syngas from entering gap 112 and combining with the pressurizing fluid.

A quench wall 116, in the exemplary embodiment, includes a plurality of substantially parallel tubes (not shown) that extend downstream from heat exchange wall 102 to define a portion of main syngas flowpath 108. The tubes may channel a heat transfer fluid, such as water and/or steam, therethrough. In the exemplary embodiment, quench wall 116 is substantially conical and tapers inward, or converges, from an upstream end 118 towards a downstream end 120. Moreover, upstream end 118 may be coupled to, and/or positioned adjacent to, header 106. In the exemplary embodiment, header 106 is coupled to a downstream end 122 of heat exchange wall 102. Alternatively, quench wall 116 may be coupled to any other suitable component within syngas cooler 100 that enables cooler 100 to function as described herein. Furthermore, in the exemplary embodiment, downstream end 120 is coupled to a quench ring 124 within a quench chamber 126.

In the exemplary embodiment, quench chamber 126 facilitates the rapid cooling of syngas flowing therethrough. Moreover, in the exemplary embodiment, quench chamber 126 includes quench ring 124, a dip tube 128, a draft tube 130, splash plate 114, a water bath 132, and a syngas outlet 134. Although water is described herein as the fluid used to quench the syngas, any suitable non-reactive fluid, such as a liquid and/or a gas, may be used for quenching. In the exemplary embodiment, quench ring 124 is coupled within quench chamber 126 such that an outlet (not shown) of quench ring 124 is directed towards main syngas flowpath 108. An inlet tube (not shown) of quench ring 124 extends from quench ring 124 through shell wall 104 and may be coupled to a sump (not shown), a quench water supply (not shown), and/or any other suitable component that enables cooler 100 to function as described herein.

In the exemplary embodiment, dip tube 128 and draft tube 130 are substantially concentrically aligned with axis 110. An upstream end 136 of dip tube 128 and an upstream end 138 of draft tube 130 are positioned adjacent to quench wall 116. A downstream end 140 of dip tube 128 and a downstream end 142 of draft tube 130 extend into water bath 132. Furthermore, in the exemplary embodiment, splash plate 114 is generally annular and extends about draft tube 130. Although splash plate 114 has a substantially circular cross-sectional shape in the exemplary embodiment, alternatively, splash plate 114 may have any cross-sectional shape that enables cooler 100 to function as described herein. In the exemplary embodiment, splash plate 114 converges from an upstream end 144 towards a downstream end 146 such that plate 114 is at least partially conical. In alternative embodiments, splash plate 114 may be substantially cylindrical and/or may diverge from end 144 towards end 146. In the exemplary embodiment, splash plate 114 is formed from a plurality of segments 148, such as, but not limited to, twelve segments 148. Furthermore, in the exemplary embodiment, splash plate upstream end 144 is coupled to heat exchange wall downstream end 122 and/or to quench wall upstream end 118 via header 106. In an alternative embodiment, splash plate 114 is positioned adjacent to, but is not coupled to, heat exchange wall end 122 and/or quench wall end 118.

Water bath 132 includes, in the exemplary embodiment, water (not shown), a sump (not shown), and/or a blowdown line (not shown). Although water bath 132 is described as having water therein, water bath 132 may include fluids other than water and still be considered a "water bath." Rather, water bath 132 is a portion of quench chamber 126 that is configured to retain water therein. In the exemplary embodiment, dip and draft tubes 128 and 130, respectively, are each at least partially submerged in water within water bath 132. The sump may be coupled to a lockhopper (not shown), a pump (not shown), and/or any other wet particulate removal device that enables system 10 to function as described herein. In addition, in the exemplary embodiment, quench chamber 126 includes at least one syngas outlet 134 that extends through shell wall 104. Syngas outlet 134 may be coupled to gas turbine engine 20 (shown in FIG. 1), cleanup device 32 (shown in FIG. 1), and/or any other suitable component that enables system 10 to function as described herein. In the exemplary embodiment, outlet 134 is upstream from splash plate downstream end 146.

During system operation, syngas is channeled from gasifier 16 to cooler 100. A regulated purge of the pressuring fluid, with a limited flow rate, is directed into gap 112 from the top of cooler 100 to pressurize gap 112. In one embodiment, nitrogen is channeled to gap 112 from ASU 14 (shown in FIG. 1). Seal assembly 200 facilitates allowing the pressurizing fluid to discharge from gap 112 at a limited rate and also substantially prevents syngas from entering gap 112. Syngas flows through heat exchange wall 102 and into quench chamber 126. More specifically, heat exchange wall 102 and quench wall 116 channel the syngas into quench chamber 126. Water is channeled into quench ring 124 for discharge into quench chamber 126 along an inner wall 150 of dip tube 128 and into water bath 132. As such, syngas flows past the wet inner wall 150 of dip tube 128. Slag (not shown) formed as the syngas cools falls into water bath 132 for discharge from cooler 100. As the syngas flows through and/or along dip tube 128, draft tube 130, and/or splash plate 114, the particulates within syngas form slag. The remaining syngas is substantially particulate-free and is discharged from cooler 100 through syngas outlet 134 for use within system 10.

Figure 3:
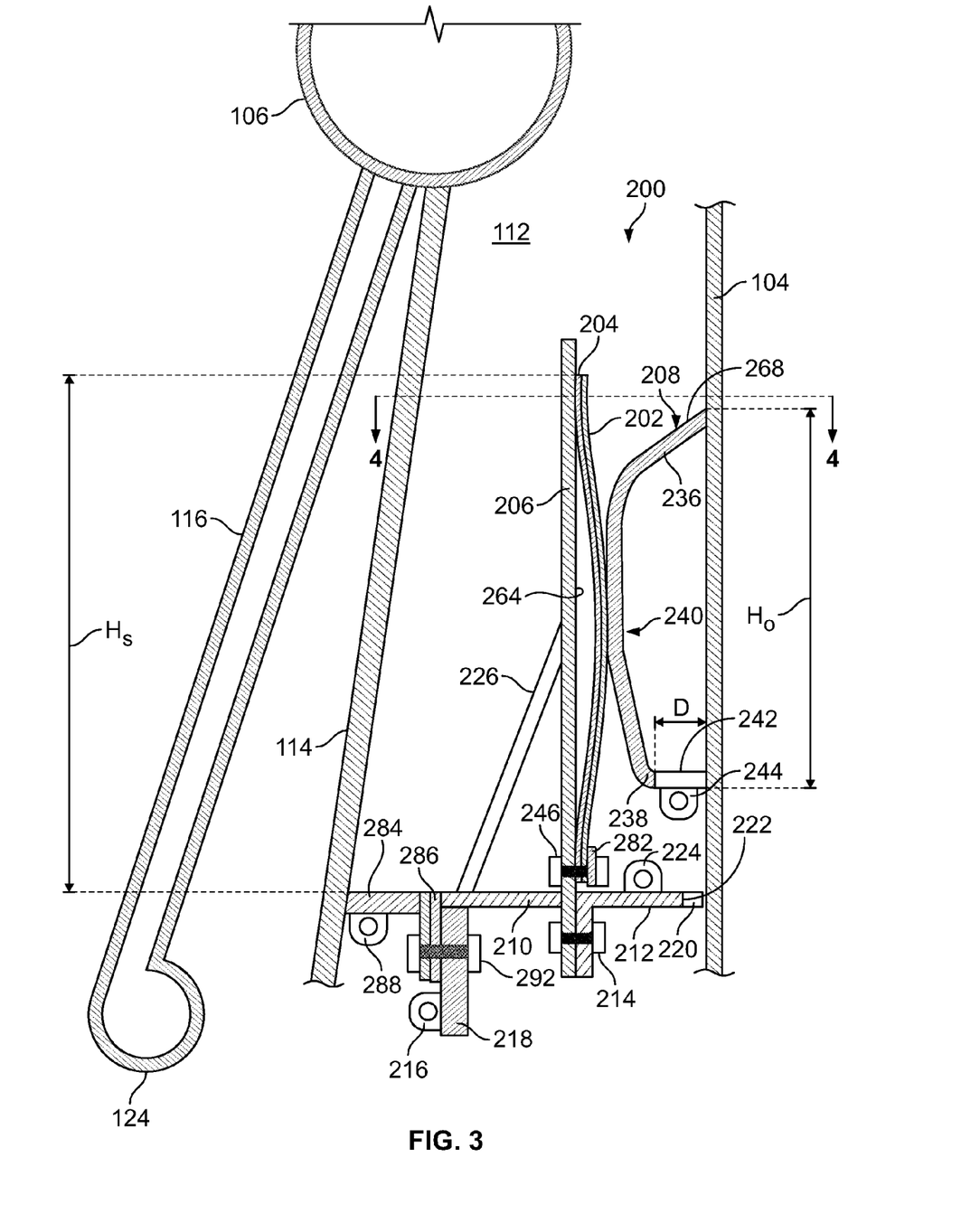
FIG. 3 is an enlarged view of a portion of an exemplary sealing assembly shown in FIG. 2 taken along area 3.
Figure 4:
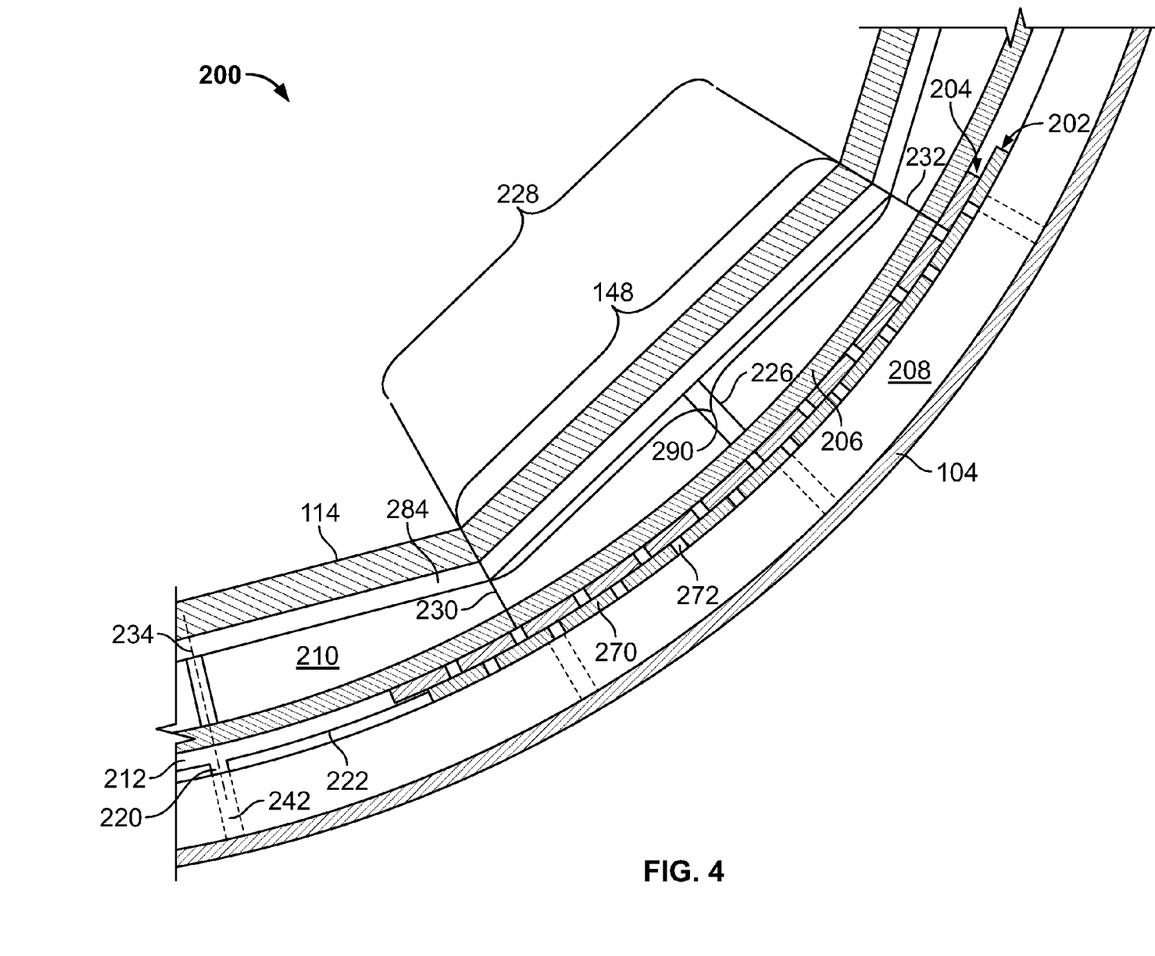
FIG. 4 is a schematic top view of the sealing assembly shown in FIG. 3 and taken at line 4-4.
Figure 5:
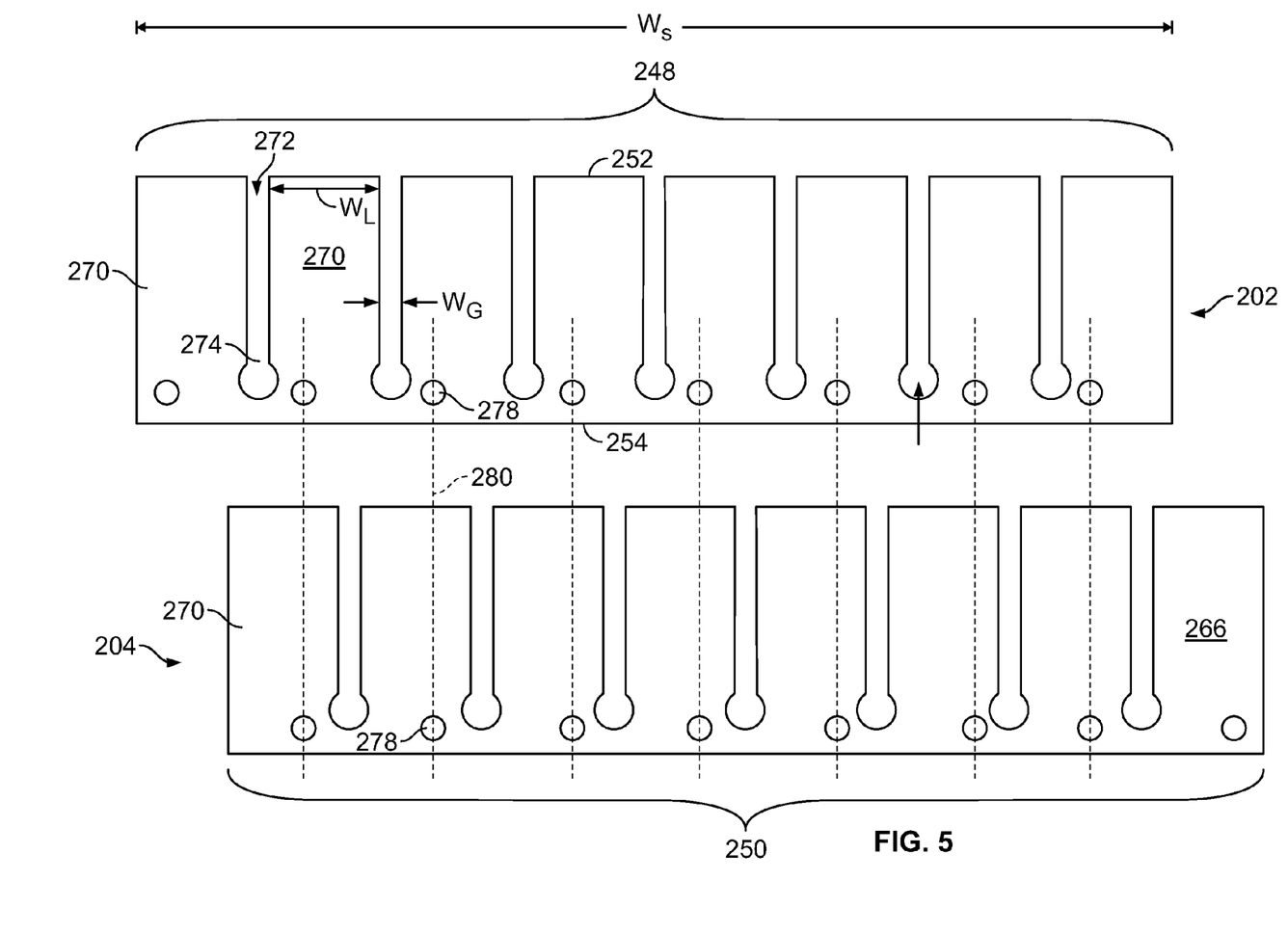
FIG. 5 is a schematic front view of the sealing assembly shown in FIG. 4.
Figure 6:
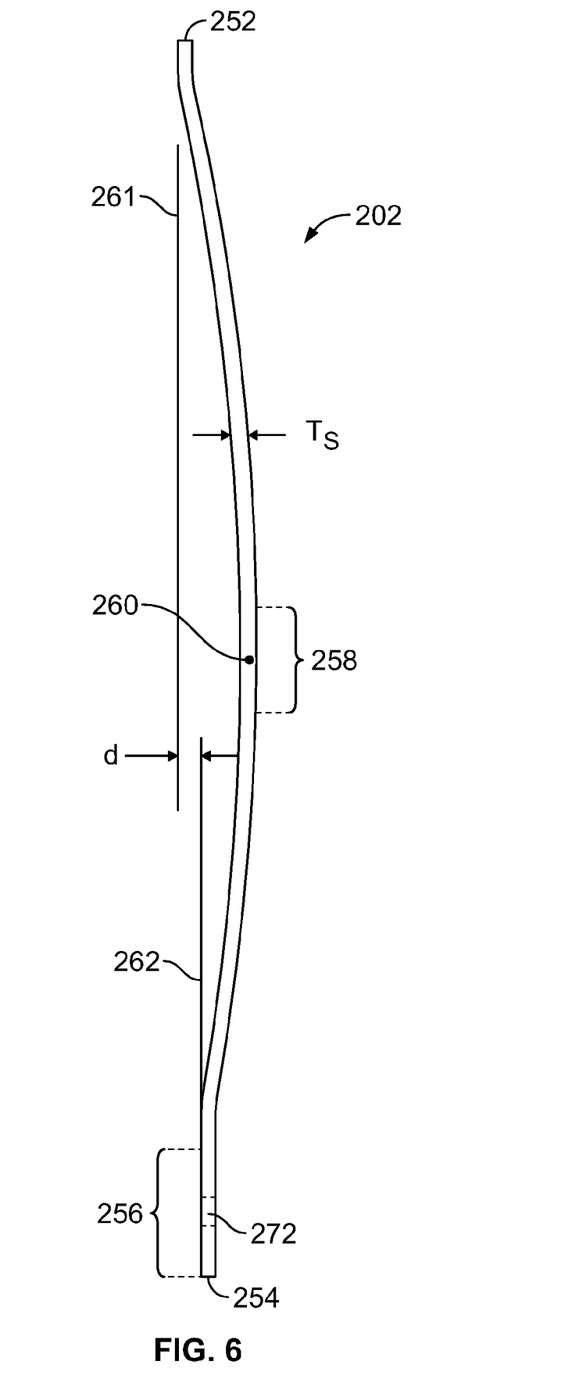
FIG. 6 is a schematic cross-sectional view of the sealing assembly shown in FIG. 4.

FIG. 3 is an enlarged view of a portion of sealing assembly 200 taken along area 3 (shown in FIG. 2). FIG. 4 is a schematic top view of sealing assembly 200 taken at line 4-4 (shown in FIG. 3). FIG. 5 is a front view of seal layers 202 and 204. FIG. 6 is a cross-sectional view of first seal layer 202. In the exemplary embodiment, seal assembly 200 is a compression-type seal or "hula" seal. Although seal assembly 200 in shown coupled within cooler 100, seal assembly 200 may be coupled within any suitable pressurized vessel, such as a heat exchanger, a gas turbine engine casing, and/or a nuclear boiler. Further, seal assembly 200 may be coupled between any suitable outer vessel wall and any suitable internal member, and is not limited to being coupled between shell wall 104 and splash plate 114, as described herein.

In the exemplary embodiment, seal assembly 200 includes an annular inner ring 206, an opposite annular outer ring 208, an annular first seal layer 202, and an annular second seal layer 204. Inner ring 206 and outer ring 208 are, in the exemplary embodiment, fabricated from a high alloy steel, and seal layers 202 and 204 are, in the exemplary embodiment, fabricated from a high alloy steel, which has a high yield strength and elastic modulus and performs well in high-temperature, high-pressure, corrosive environments. Alternatively, inner ring 206, outer ring 208, first seal layer 202, and/or second seal layer 204 may be fabricated from any suitable materials that enables seal assembly 200 to function as described herein. Although seal assembly 200 is described herein as having two seal layers 202 and 204, seal assembly 200 may include one or more seal layers depending on flow requirements with a vessel.

In the exemplary embodiment, inner ring 206 is substantially cylindrical and is substantially concentrically aligned with shell wall 104. As such, inner ring 206 extends circumferentially within gap 112 about splash plate 114 and/or any other suitable internal structure within shell wall 104. Inner ring 206 includes an annular base 210 to which inner ring 206 is coupled using, for example, welding. Inner ring 206 also includes an annular baffle 212 to which inner ring 206 is coupled using, for example, a bolt 214. Alternatively, base 210 and/or baffle 212 are coupled to inner ring 206 using any suitable fastening device, mechanism, and/or technique that enables seal assembly 200 to function as described herein.

In the exemplary embodiment, base 210 is substantially L-shaped and includes a hook 216 that extends radially inwardly from a connection portion 218 of base 210. Connection portion 218 is substantially parallel to inner ring 206. Baffle 212, in the exemplary embodiment, is substantially L-shaped and includes a spacer 220 that extends radially outward from an outer surface 222 of baffle 212. Alternatively, baffle 212 does not include spacer 220. In the exemplary embodiment, baffle 212 also includes a hook 224 that extends generally axially upstream from baffle 212. Furthermore, in the exemplary embodiment, a stiffener 226 extends between inner ring 206 and base 210. More specifically, in the exemplary embodiment, stiffener 226 is oblique with respect to inner ring 206 and base 210 and is configured in any suitable configuration that facilitates maintaining a position of inner ring 206. Alternatively, stiffener 220 may be omitted from seal assembly 200 as long as seal assembly 200 functions as described herein.

Inner ring 206 is formed from a plurality of segments 228. More specifically, inner ring 206, including base 210 and baffle 212, is divided into a predetermined number of segments 228. In the exemplary embodiment, inner ring 206 includes a plurality of segments 228, and each segment 228 spans a predetermined portion of a circle (not shown) formed by shell wall 104. Alternatively, inner ring 206, including base 210 and baffle 212, is formed from one segment 228. Furthermore, in the exemplary embodiment, each segment 228 includes one stiffener 226, two hooks 216, and two hooks 224. Stiffener 226 is substantially centered with respect to segment 228, and hooks 216 and/or 224 are proximate to a respectively end 230 and/or 232 of segment 228. Alternatively, segment 228 may include any number of stiffeners 226, hooks 216, and/or hooks 224 that enables seal assembly 200 to function as described herein. Moreover, in the exemplary embodiment, a subset of the segments 228 includes spacer 220. Alternatively, none or more segments 228 include spacer 220. In the exemplary embodiment, spacers 220 are spaced at a predetermined distance with respect the circle formed by shell wall 104. Alternatively, all or none of segments 228 include spacer 220.

In the exemplary embodiment, outer ring 208 has a cross-sectional shape that is substantially non-planar with respect to shell wall 104. More specifically, outer ring 208 has a first end 236, a second end 238, and an arcuate portion 240 that extends between first end 236 and second end 238. Portion 240 may have any cross-sectional shape that enables seal assembly 200 to function as described herein. In the exemplary embodiment, the shape of outer ring 208 is optimized to facilitate minimizing the risk of damage to seal assembly 200 during installation. Furthermore, in the exemplary embodiment, inner ring 206 and outer ring 208 are shaped and sized to facilitate minimizing the formation of syngas pockets and to resist buckling in the high-pressure environment of gap 112.

In the exemplary embodiment, first end 236 is coupled to shell wall 104 by, for example, welding. Alternatively, first end 236 may be coupled to shell wall 104 using any suitable coupling means that enables seal assembly 200 to function as described herein. Second end 238 is spaced from shell wall 104 by a predetermined distance D. At least one support bar 242 extends between second end 238 and shell wall 104. In the exemplary embodiment, support bar 242 includes a hook 244 that extends generally axially downstream therefrom. In one embodiment, outer ring 208 includes a plurality of support bars 242 that are spaced a predetermined distance apart. Furthermore, in such an embodiment, hooks 244 are generally aligned with baffle hooks 224.

Seal layers 202 and 204 are, in the exemplary embodiment, coupled to inner ring 206. More specifically, layers 202 and 204 are coupled to inner ring 206 using a fastener, such as bolt 246. Alternatively, layers 202 and 204 may be coupled to inner ring 206 using any suitable mechanism, fastener, and/or technique that enables seal assembly 200 to function as described herein. In the exemplary embodiment, second seal layer 204 is coupled circumferentially about inner ring 206, and first seal layer 202 is coupled circumferentially about second seal layer 204 such that first and second seal layers 202 and 204 overlap, as described in more detail below. Furthermore, in the exemplary embodiment, and referring to FIG. 5, seal layers 202 and 204 are each divided into segments 248 and 250, respectively, that correspond to inner ring segments 228. More specifically, in the exemplary embodiment, the number of layer segments 248 and/or 250 is equal to the number of inner ring segments 228. Moreover, each first seal layer segment 248 at least partially overlaps each circumferentially adjacent second seal layer segment 250. In the exemplary embodiment, seal assembly 200 includes twelve layer segments 248 and 250. Alternatively, seal assembly 200 may include any suitable number of segments 248 and/or 250 that enable seal assembly 200 to function as described herein.

Furthermore, in the exemplary embodiment, and referring to FIG. 6, seal layers 202 and 204 are substantially similar, and accordingly, for simplicity, only first seal layer 202 will be described in detail. Seal layer 202 has a generally arcuate, curved, and/or non-planar cross-sectional shape with respect to inner ring 206, as extending from a top edge 252 to a bottom edge 254. In the exemplary embodiment, although seal layer 202 is generally arcuate, seal layer 202 includes a first substantially planar section 256 that is adjacent to bottom edge 254, and a second substantially planar section 258 that is approximately at a midpoint 260 between top edge 252 and bottom edge 254. In an alternative embodiment, seal layer 202 does not include planar sections 256 and/or 258. Alternatively, seal layer 202 has any cross-sectional shape that enables seal assembly 200 to function as described herein.

Furthermore, in the exemplary embodiment, top edge 252 is substantially co-planar with, or is substantially parallel to inner ring 206 when seal assembly 200 is assembled. As such, bottom edge 254 and top edge 252 of second seal layer 204 contact an outer surface 264 of inner ring 206, and bottom edge 254 and top edge 252 of first seal layer 202 contact an outer surface 266 of second seal layer 204 when seal assembly 200 is assembled. When layer 202 is not assembled with inner ring 206, top edge 252 is offset a predetermined distance from bottom edge 254. More specifically, top edge 252 is generally aligned with a first vertical plane 261 and bottom edge 254 is generally aligned with a second vertical plane 262 that is spaced outward a predetermined distance d from first vertical plane 261. As such, when seal layer 202 is coupled to inner ring 206, inner ring 206 biases top edge 252 radially outward and induces a tension in seal layer 202.

Moreover, seal layer 202 has a height $H_S$ that is larger that a height $H_O$ of outer ring 208, such that top edge 252 is upstream from a top edge 268 of outer ring 208. Additionally, seal layer 202 has a substantially constant thickness $T_S$ and a constant width $W_S$. The thickness $T_S$ is substantially smaller than height $H_S$ and/or width $W_S$. Alternatively, seal layer 202 may have any suitable dimensions that enable seal assembly 200 to function as described herein. In one embodiment, thickness $T_S$, width $W_S$, and/or height $H_S$ are variable across layer 202.

In the exemplary embodiment, and referring to FIGS. 4 and 5, seal layer 202 includes a plurality of leaves 270 defined therein. Each leaf 270 has approximately the same width $W_L$. In the exemplary embodiment, width $W_L$ is selected based on a size of cooler 100 (shown in FIGS. 1 and 2). More specifically, in the exemplary embodiment, width $W_L$ is selected to ensure that each segment 248 and 250 includes a predetermined number leaves 270. In an alternative embodiment, width $W_L$ for second seal layer 204 is less than width $W_L$ for first seal layer 202. Alternatively, the number and/or width $W_L$ of leaves 270 is selected to ensure that seal assembly 200 functions as described herein.

In the exemplary embodiment, a gap 272 is defined between adjacent leaves 270. Gap 272 extends from top edge 252 partially through first seal layer 202 towards bottom edge 254. Moreover, each gap 272 is sized with approximately the same width $W_G$ that is selected based on flow requirements within a vessel. In the exemplary embodiment, width $W_L$ and/or width $W_G$ may have any suitable size and/or orientation that enables seal assembly 200 to function as described herein.

In the exemplary embodiment, at a bottom end 274 of each gap 272, a stress-relief aperture 276 is defined through seal layer 202. Stress-relief aperture 276 has any suitable diameter, shape, and/or orientation that enables seal assembly 200 to function as described herein. Furthermore, in the exemplary embodiment, seal layer 202 includes a plurality of bolt apertures 278 defined therethrough. Bolt apertures 278 are oriented such that apertures 278 defined in first seal layer 202 are generally aligned with a respective bolt aperture 278 defined in second seal layer 204. Alignment is illustrated by lines 280. More specifically, in the exemplary embodiment, seal layers 202 and 204 are oriented such that gap 272 in first seal layer 202 is overlapped by a leaf 270 of second seal layer 204, and vice versa. Furthermore, each leaf 270 of first seal layer 202 overlaps two leaves 270 of second seal layer 204, both of which are adjacent to each other.

Referring to FIG. 3, seal assembly 200 also includes, in the exemplary embodiment, a seal protector 282. More specifically, seal protector 282 is coupled to first seal layer 202 and substantially encircles first seal layer 202, second seal layer 204, and inner ring 206. Seal protector 282 prevents damage and/or wear to seal assembly 200 during manufacturing and/or fabrication processes, such as a welding process. Seal protector 282 may optionally be omitted from seal assembly 200. In the exemplary embodiment, seal protector 282 is annular and is divided into segments (not shown) that correspond to inner ring segments 228 and/or seal layer segments 248 and/or 250. Alternatively, seal protector 282 is fabricated as a single piece. In the exemplary embodiment, seal protector 282 may have any suitable size, dimensions, and/or orientation that enables seal assembly 200 to function as described herein. In the exemplary embodiment, seal protector 282 is coupled to seal layers 202 and 204 and inner ring 206 using bolt 246. For example, a height of seal protector 282 should be selected such that seal protector 282 doe not affect a curvature of seal layers 202 and/or 204. In an alternative embodiment, seal protector 282 is coupled to seal layers 202 and/or 204 and/or inner ring 206 using any suitable mechanism, technique, and/or fastener that enables seal assembly 200 to function as described herein.

In the exemplary embodiment, seal assembly 200 also includes a connector 284 and a shim 286. Alternatively, seal assembly 200 does not include shim 286. Alternatively, seal assembly 202 may include any suitable biasing member, such as a spring-loaded bolt, instead of including shim 286. Connector 284, in the exemplary embodiment, is substantially L-shaped and includes a hook 288 that extends generally axially downstream from connector 284. Alternatively, connector 284 has any suitable configuration for coupling inner ring 206 within cooler 100. In the exemplary embodiment, connector 284 is divided into a number of segments 290 that correspond to the number of inner ring segments 228 and/or splash plate segments 148. In an alternative embodiment, connector 284 is fabricated as a single piece. In the exemplary embodiment, connector 284 is sized to contact, and be coupled to, splash plate 114 at a predetermined radius (not shown). Moreover, in the exemplary embodiment, connector 284 is coupled to base connection portion 218 using a bolt 292; however, connector 284 may be coupled to base 210 using any suitable fastener, mechanism, and/or technique.

Shim 286 is coupled between connector 284 and base 210, and is adjustable to facilitate the proper alignment of seal assembly 200 within gap 112. In the exemplary embodiment, shim 286 has a substantially rectangular cross-sectional shape. Furthermore, in the exemplary embodiment, shim 286 includes a plurality of pieces (not shown) that form the rectangular cross-sectional shape, as described in more detail below. In an alternative embodiment, shim 286 has a triangular cross-sectional shape. In such an embodiment, shim 286 is a wedge (not shown) and tightens seal assembly 200 within gap 112. Alternatively, shim 286 has any size, number of pieces, and/or configuration that enables seal assembly 200 to function as described herein. In the exemplary embodiment, shim 286 is coupled between connector 284 and base connection portion 218 using bolt 292. In an alternative embodiment, shim 286 is coupled to connector 284 and/or base 210 using welding and/or any other suitable fastener, mechanism, and/or technique.

To assemble seal assembly 200, in the exemplary embodiment, connector 284 is coupled to splash plate 114 using, for example, a welding process. More specifically, in the exemplary embodiment, connector segment 290 is coupled to a respective splash plate segment 148. Outer ring 208 is coupled to shell wall 104 using, for example, a welding process. Support bars 242 are coupled between second end 238 of outer ring 208 and shell wall 104 using, for example, welding. Shim 286 is coupled to connector 284. Each inner ring segment 228 is formed by coupling a portion (not shown) of inner ring 206 to respective portions (not shown) of base 210 and baffle 212. More specifically, in the exemplary embodiment, inner ring 206 is welded to base 210 and bolted to baffle 212. Stiffener 226 is coupled to inner ring 206 and base 210 of each segment 228. In the exemplary embodiment, stiffener 226 is welded to inner ring 206 and base 210.

Each second seal layer segment 250 is coupled to a respective inner ring segment 228, and each first seal layer segment 248 is coupled to second seal layer segment 250, such that first seal layer 202 and second seal layer 204 are aligned as described above. Seal protector 282 is coupled to first seal layer 202. Once each segment 228 is assembled, the segments 228 are coupled to splash plate 114 by coupling each base connection portion 218 to each connector 284 to form an annular assembly (not shown). Adjacent inner ring segments 228 are then coupled together using, for example, a welding process, and adjacent splash plate segments 148 are coupled together using, for example, a welding process. The annular assembly of splash plate 114, inner ring 206, and layers 202 and 204 is positioned near the top of cooler 100 and is lowered through cooler 100 to approximately a final installed position such that first seal layer 202 contacts outer ring 208. Heat exchange wall 102 (shown in FIG. 2) is then lowered through cooler 100 and coupled to splash plate 114 and/or quench wall 116 via header 106. As such, seal layers 202 and 204 are compressed between inner ring 206 and outer ring 208.

During operation of cooler 100, seal layers 202 and 204 are compressed between inner ring 206 and outer ring 208 such that seal assembly 200 creates a small effective area or leak path (not shown) through which the pressurizing fluid flows. For example, in one embodiment, the effective area is approximately sized to reduce the consumption of the pressurizing fluid during normal operating conditions (NOC). As such, seal assembly 200 generates a positive flow (not shown) through gap 112 and the seal layers 202 and 204. The positive flow substantially prevents syngas from flowing into gap 112 and/or collecting in corrosive pockets (not shown), and/or prevents the accumulation of residual solid particulate matter (not shown) in gap 112. During a syngas backflow event, a center portion, such as second planar portion 258, of leaves 270 deflects away from outer ring 208 to facilitate increasing the effective area and to facilitate reducing the pressure difference. As such, the stresses induced across heat exchange wall 102 are facilitated to be reduced.

Figure 7:
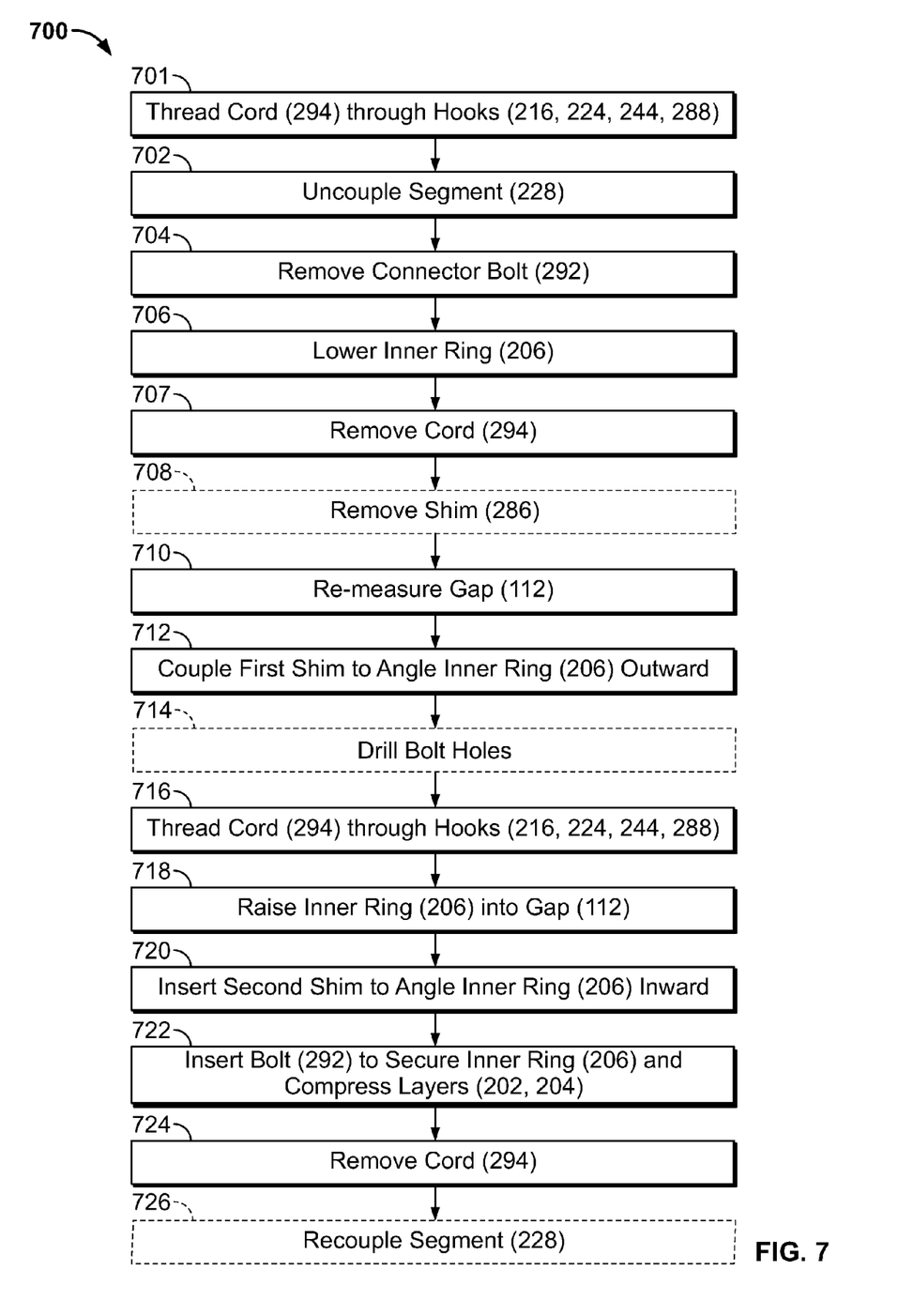
FIG. 7 is a flowchart of an exemplary method for replacing the sealing assembly shown in FIG. 2.
Figure 8:
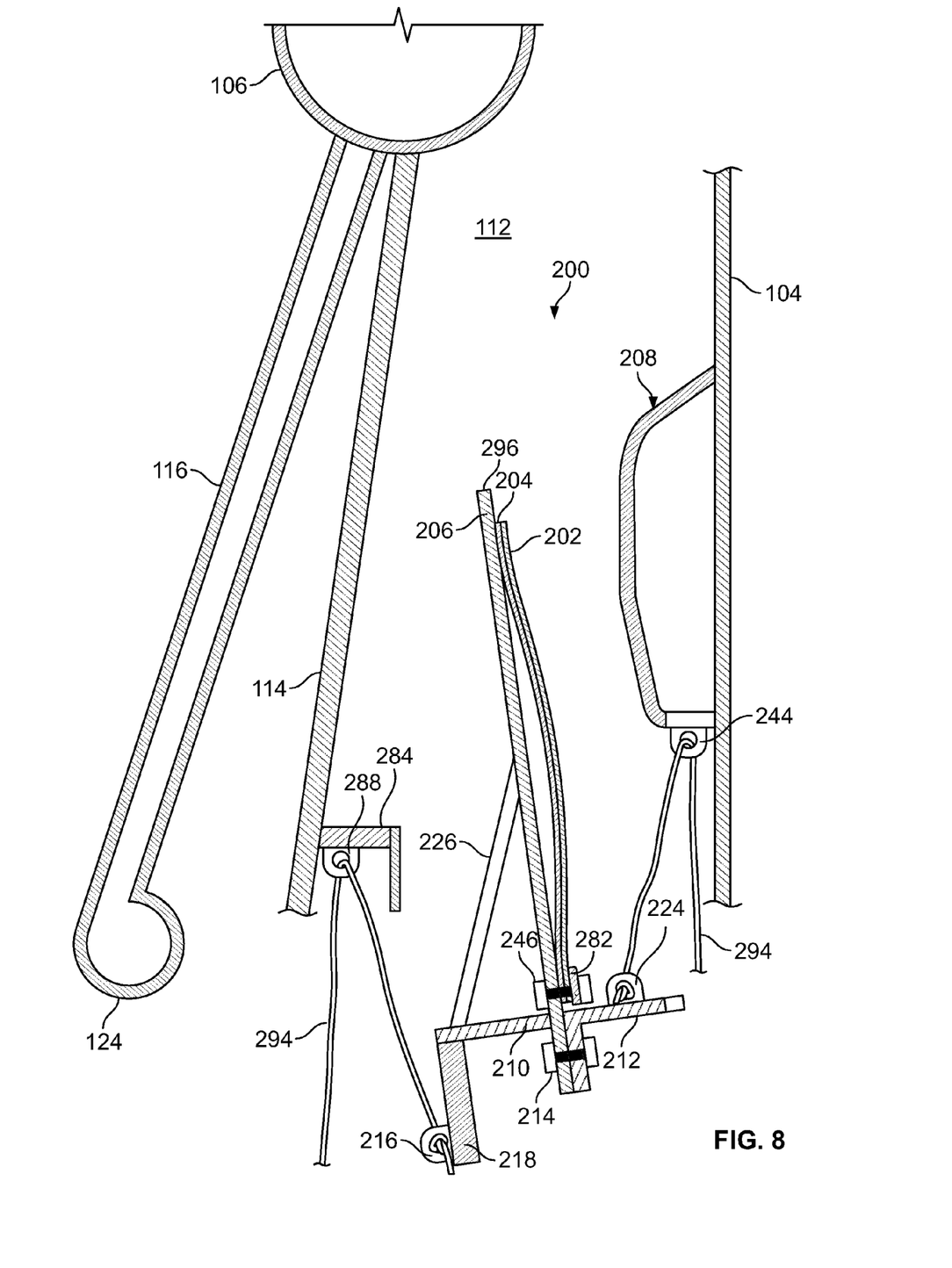
FIG. 8 is a schematic cross-sectional view of the sealing assembly shown in FIG. 2 being replaced using the method illustrated in FIG. 7.

FIG. 7 is a flowchart of an exemplary embodiment of a method 700 for replacing at least a portion of seal assembly 200. FIG. 8 is a schematic cross-sectional view of seal assembly 200 being installed using method 700.

To replace at least one segment 228 (shown in FIG. 4) of seal assembly 200, at least one cord 294 is threaded 701 through hooks 288, 216, 224, and/or 244. As used herein, the term "cord" refers to a chain, wire, rope, cordage, fiber, line, link, linkage, string, tie, twine, braiding, cable, lanyard, strand, string, thread, binding, harness, ligature, stay, strap, and or any other suitable mechanism used to implement method 700. Then the particular segment 228 is uncoupled 702 from adjacent segments 228. For example, in the exemplary embodiment, a weld (not shown) between adjacent segments 228 is ground away. Connector bolt 292 (shown in FIG. 3) is removed 704 such that base 210 is uncoupled from cooler 100 (shown in FIGS. 1 and 2). Inner ring 206, with seal layers 202 and 204, is then lowered 706 out of gap 112 via cord 294. Cord 294 is then removed 707 from seal assembly 200. Optionally, shim 286 (shown in FIG. 3) is removed 708 from connector 284.

To re-install segment 228 within gap 112, gap 112 is re-measured 710, and a first shim (not shown) is coupled 712 to connector 284 such that a base (not shown) of a triangular cross-sectional shape forms an upstream surface (not shown) of the first shim. If needed, bolt holes (not shown) are drilled 714 through connector 284, the first shim, and/or base 210. At least one cord 294 is threaded 716 through hooks 288, 216, 224, and/or 244. Using cord 294, inner ring 206 including seal layers 202 and 204 is raised 718 though cooler 100 and into gap 112, to be adjacent to connector 284 and/or outer ring 208, as illustrated in FIG. 8. In the exemplary embodiment, when inner ring 206 is proximate to connector 284 and/or outer ring 208, inner ring 206 is oriented slightly obliquely with respect to axis 110 (shown in FIG. 2). As such, inner ring 206 is angled radially outward at a top edge 296 because of the orientation of the first shim. Once base 210 contacts the first shim, a second shim (not shown) is inserted 720 between the first shim and base 210 such that a base (not shown) of a triangular cross-sectional shape forms a downstream surface (not shown) of the second shim. As such, the first and second shims form shim 286 (shown in FIG. 3), and inner ring 206 is substantially aligned with axis 110, rather than being at an angle to axis 110. Connector bolt 292 is then inserted 722 through connector 284, shim 286, and base 210 to secure inner ring 206 within gap 112. Cord 294 is then removed 724 from seal assembly 200, and segment 228 may be recoupled 726 to adjacent segments 228 using, for example, welding. Method 700 may be repeated for each segment 228 that is to be replaced.

The above-described seal assembly and methods facilitate providing a controlled leakage of nitrogen from a gap proximate to the tubecage into a quench region. Specifically, the seal assembly described herein creates a small effective area, or leak path, that enables low nitrogen consumption during normal operating conditions (NOC) and exhibits pressure relief capability during transients. By controlling the leakage, the seal assembly facilitates minimizing syngas diffusion into the gap and facilitates preventing excessive stresses from being induced in the tubecage from transients, such as lightoff and/or purge events. Even after a syngas blowback event, the seal assembly described herein enables the positive flow to resume as the system reaches NOC and enables the pockets of syngas to be purged from the gap. As such, the seal assembly facilitates protecting a cooler vessel shell from dew point corrosion and/or protecting the tubecage from buckling and/or wear due to over-pressurization. Furthermore, the seal assembly has a flexible seal design that can accommodate thermal expansion of the tubecage and the vessel shell, manufacturing tolerances such as vessel shell out of roundness, misalignment due to installation and/or changes during operation, such as creep and/or other changes. Moreover, the seal assembly has a simple and robust mechanical design with an all-metal structure and no moving parts, each of which will tolerate corrosive environments, such as those within a syngas cooler. Such a design facilitates consistent performance of the seal assembly over an approximately 30-year life.

The leaves of the seal assembly described herein are flexible "hula" leaves and are preloaded with a curved profile, or cross-sectional shape, that is taller than a gap defined between an inner support ring and an outer support ring. Such preloading presses the center portion of the leaves against the outer support ring, while the two ends of each leaf make contact with the inner support ring. The preloaded profile also facilitates accommodating thermal expansion of the tubecage and vessel by allowing the seal assembly to flex. The above-described seal assembly includes two layers of leaves such that the effective area between the support rings is minimized. Furthermore, the leaves are separated by a narrow gap, in comparison to the width of the leaves, to enable each leaf to function independently of adjacent leaves. As such, the leaf and gap configuration enables the seal assembly to operate consistently, despite variations in flow around the circumference of the gap.

The above-described support rings facilitate minimizing the formation of syngas pockets and/or the buckling of the seal assembly in the high-pressure environment of the gap. More specifically, the profile of the outer ring is optimized to facilitate minimizing the risk of damage to the seal during re-installation. The inner support ring described herein includes removable segments that enable individual replacement during inspection and/or maintenance. Furthermore, each inner ring segment may be selectively sized before and/or after initial installation to facilitate reducing the variation in the size of the gap defined between the inner and outer rings due to manufacturing and alignment tolerances.

Additionally, the methods described herein facilitate an installation that is cost-effective and time-efficient, as compared to installation of known seals. The methods described herein also enable the seal assembly to be accessible for inspection and/or maintenance. More specifically, the seal assembly includes a plurality of sections that are initially installed together and are re-installed individually during maintenance.

Moreover, as compared to hula seals designed for use in a combustion cycle of gas turbines, the above-described seal assembly has a different application, scale, and installation methods. More specifically, the seal assembly described herein is, but is not limited to being, approximately 150 inches to approximately 200 inches in diameter with leaves of, for example, but not limited to, approximately 4 inches to approximately 6 inches in width. Known hula seals in combustion applications are typically only approximately 10-20 inches in diameter with leaves that are only approximately 1 inch wide. Such scaling of above-described seal assembly facilitates altering the deflection of the leaves because the radius of curvature is significantly larger in the above-described seal assembly as compared to hula seal in combustion engines.

Exemplary embodiments of a sealing assembly and methods of assembling the same are described above in detail. The methods and apparatus are not limited to the specific embodiments described herein, but rather, components of the apparatus and/or steps of the methods may be utilized independently and separately from other components and/or steps described herein. For example, the methods may also be used in combination with other seal assemblies and methods, and are not limited to practice with only the seal assembly as described herein. Rather, the exemplary embodiment can be implemented and utilized in connection with many other sealing applications.

Although specific features of various embodiments of the invention may be shown in some drawings and not in others, this is for convenience only. In accordance with the principles of the invention, any feature of a drawing may be referenced and/or claimed in combination with any feature of any other drawing.

While the methods and systems described herein have been described in terms of various specific embodiments, those skilled in the art will recognize that the methods and systems described herein can be practiced with modification within the spirit and scope of the appended claims.

What is claimed is:

1. A method for assembling a seal assembly, said method comprising:
    coupling a first ring within a vessel;
    coupling a second ring within the vessel;
    coupling a first seal layer between the first ring and the second ring such that the first seal layer contacts at least the first ring;
    forming a plurality of leaves within the first seal layer;
    coupling a second seal layer to the first seal layer such that the second seal layer contacts the second ring, the second seal layer including a plurality of leaves defined therein;
    coupling a baffle to the first ring, such that a spacer extends radially outward from the baffle; and
    coupling a protector to the first seal layer.

2. A method in accordance with claim 1 further comprising:
    aligning the plurality of leaves such that a first leaf of the first seal layer partially overlaps at least two leaves of the second seal layer.

3. A method in accordance with claim 1 further comprising coupling the second ring to a wall of a syngas cooler.

4. A method in accordance with claim 3 further comprising coupling at least one support between the second ring and the wall.

5. A method in accordance with claim 1 further comprising coupling the first ring to an internal structure within a syngas cooler.

6. A method in accordance with claim 5 further comprising coupling at least one of a connector and a shim between the first ring and the internal structure.

7. A method in accordance with claim 1 further comprising positioning the inner ring using a cord and a plurality of hooks defined on the first ring and the second ring such that the first seal layer engages the second ring.

8. A seal assembly for use within a pressurized vessel, said seal assembly comprising:
    a first ring;
    a second ring spaced radially outwardly from said first ring;
    a first seal layer coupled to said first ring, wherein said first seal layer contacts at least said first ring and comprises a plurality of generally axially-extending leaves, said plurality of leaves spaced apart such that a gap is defined between adjacent leaves, said gap includes slotted portion and a relief aperture extending through said seal layer;
    a second seal layer coupled to said first seal layer, said second seal layer contacts said second ring;
    a baffle coupled to said first ring;
    a spacer extending radially outward from said baffle; and
    a protector coupled to said first seal layer.

9. A seal assembly in accordance with claim 8 wherein each of said first seal layer and said second seal layer comprises a plurality of generally axially-extending leaves oriented such that a gap is defined between adjacent said leaves, wherein each leaf of said plurality of leaves has a substantially non-planar cross-sectional shape said gap includes a slotted portion and a relief aperture extending through each seal layer.

10. A seal assembly in accordance with claim 8 wherein said first seal layer is substantially concentrically aligned with said second seal layer.

11. A seal assembly in accordance with claim 8 further comprising at least one stiffener coupled to said first ring.

12. A syngas cooler comprising:
    a shell wall;
    a component coupled radially inward from said shell wall such that a gap is defined between said shell wall and said component; and
    a seal assembly coupled within said gap, said seal assembly comprising:
        a first ring coupled to said component;
        a second ring coupled to said shell wall;
        a first seal layer coupled to said first ring, wherein said first seal layer contacts at least said first ring and comprises a plurality of generally axially-extending leaves, said plurality of leaves spaced apart such that a gap is defined between adjacent leaves, said gap includes slotted portion and a relief aperture extending through said seal layer;
        a second seal layer coupled to said first seal layer, said second seal layer contacts said second ring;
        a baffle coupled to said first ring;
        a spacer extending radially outward from said baffle; and
        a protector coupled to said first seal layer.

13. A syngas cooler in accordance with claim 12 wherein each of the first seal layer and the second seal layer comprising a plurality of generally axially-extending leaves oriented such that a gap is defined between adjacent said leaves, said gap includes a slotted portion and a relief aperture extending through each seal layer.

14. A syngas cooler in accordance with claim 12 wherein said seal assembly further comprises at least one support coupled between said second ring and said shell wall.

15. A syngas cooler in accordance with claim 12 wherein said seal assembly further comprises at least one of a connector and a shim coupled between said first ring and said component.

* * * * *